(12) United States Patent
Hanioka

(10) Patent No.: US 9,458,317 B2
(45) Date of Patent: Oct. 4, 2016

(54) RESIN COMPOSITION AND RESIN MOLDED ARTICLE

(71) Applicant: FUJI XEROX CO., LTD., Tokyo (JP)

(72) Inventor: Yuto Hanioka, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/611,500

(22) Filed: Feb. 2, 2015

(65) Prior Publication Data

US 2016/0068677 A1 Mar. 10, 2016

(30) Foreign Application Priority Data

Sep. 5, 2014 (JP) .................................. 2014-181268

(51) Int. Cl.
| | | |
|---|---|---|
| *C08K 9/08* | (2006.01) | |
| *C08L 69/00* | (2006.01) | |
| *D06M 15/277* | (2006.01) | |
| *D06M 15/256* | (2006.01) | |
| *C08L 67/04* | (2006.01) | |

(52) U.S. Cl.
CPC .................. *C08L 69/00* (2013.01); *C08K 9/08* (2013.01); *C08L 67/04* (2013.01); *D06M 15/256* (2013.01); *D06M 15/277* (2013.01)

(58) Field of Classification Search
CPC .... D06M 15/256; D06M 15/277; C08K 9/08
See application file for complete search history.

(56) References Cited

U.S. PATENT DOCUMENTS

| | | | | |
|---|---|---|---|---|
| 6,087,000 A | * | 7/2000 | Girgis ................. | C03C 25/1065 428/372 |
| 6,447,868 B1 | * | 9/2002 | Sekiguchi ............ | G11B 7/2538 269/133 |
| 2006/0276582 A1 | * | 12/2006 | Mochizuki .............. | C08L 69/00 524/537 |

FOREIGN PATENT DOCUMENTS

| | | |
|---|---|---|
| JP | S59-96123 A | 6/1984 |
| JP | H06-184417 A | 7/1994 |
| JP | H07-33861 A | 2/1995 |
| JP | 2004-010825 A | 1/2004 |

* cited by examiner

*Primary Examiner* — Vickey Nerangis
(74) *Attorney, Agent, or Firm* — Oliff PLC

(57) ABSTRACT

A resin composition includes a polyester resin, a polycarbonate resin, a flame retardant, and an inorganic fiber coated with a fluorine resin, wherein a weight ratio of a content of the polyester resin and a content of the polycarbonate resin is in a range of 5:95 to 50:50.

10 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2014-181268 filed Sep. 5, 2014.

BACKGROUND

1. Technical Field

The present invention relates to a resin composition and a resin molded article.

2. Related Art

In electric products or components of electric and electronic apparatuses, high molecular materials such as polystyrene, a polystyrene-ABS resin copolymer, polycarbonate, polyester, polyphenylene sulfide, and polyacetal are used because of heat resistance, mechanical strength, and the like, and particularly in the case of the components of the electric and electronic apparatuses, the high molecular materials are used because of excellent maintainability of the mechanical strength against environmental changes.

Resin compositions containing these high molecular materials and molded articles obtainable by using the resin compositions are reviewed in various ways.

In addition, recently, in view of environmental problems, a resin composition containing a polylactic acid resin which is a kind of biodegradable polymer, and a molded article obtainable by using the resin composition has been known.

SUMMARY

According to an aspect of the invention, there is provided a resin composition including:

a polyester resin;
a polycarbonate resin;
a flame retardant; and
an inorganic fiber coated with a fluorine resin, wherein a weight ratio of a content of the polyester resin and a content of the polycarbonate resin is in a range of 5:95 to 50:50.

DETAILED DESCRIPTION

Exemplary embodiments of the invention are described as follows. The exemplary embodiments are provided as examples, and the invention is not limited thereto.

A resin composition according to the exemplary embodiment of the invention includes a polyester resin, a polycarbonate resin, a flame retardant, and an inorganic fiber coated with a fluorine resin. The weight ratio of the content of the polyester resin and the content of the polycarbonate resin is in a range of 5:95 to 50:50. The resin composition according to the exemplary embodiment includes the flame retardant and the inorganic fiber coated with the fluorine resin, and includes the polyester resin and the polycarbonate resin in the range described above, to have excellent flame retardancy and excellent anti-drip properties when molded into a molded article. In addition, the resin composition according to the exemplary embodiment has excellent moldability, and has an excellent appearance when molded into a molded article. In addition, the term "drip" means to make a burned molten resin to drip and spread.

It is suggested to use fluoropolymers, alkaline metal salts, alkaline earth metal salts, and inorganic compound particles such as needle-shaped inorganic compound particles such as glass fibers, without using a bromine flame retardant or phosphorus flame retardant, for a resin composition that has excellent flame retardancy, and particularly excellent anti-drip properties of the burning material while maintaining mechanical characteristics of aromatic polycarbonate. However, because of a candle effect in which fire is not likely to go out, the flame retardancy is deficient, variation of the flame retardancy is great, and the enhancement of the mechanical strength or the dimensional stability is insufficient. The inventors of the invention have found that the resin composition containing a polyester resin and a polycarbonate resin, which further includes a flame retardant and an inorganic fiber coated with a fluorine resin and includes the polyester resin and the polycarbonate resin in a specific range, has excellent flame retardancy and excellent anti-drip properties when molded into a molded article. In addition, the inventors of the invention have found that the resin composition according to the exemplary embodiment has excellent moldability and has excellent appearance when molded into a molded article.

Polyester Resin

Examples of the polyester resin include an aliphatic polyester resin and an aromatic polyester resin. The polyester resin is greatly divided into a microorganism produced polymer, a synthetic polymer, and a semi-synthetic polymer. Examples of the microorganism produced polymer include polyhydroxy butyric acid, polyhydroxy valeric acid. Examples of the synthetic polymer include polycapolactone, and condensate of aliphatic dicarboxylic acid and aliphatic diol. Examples of the semi-synthetic polymer include polylactic acid polymer (polylactic acid resin). The polyester resins may be used singly, or two or more types thereof may be used in combination.

Among the polyester resins, in view of the workability, biodegradability, and the like, the semi-synthetic polymer is preferable, and the polylactic acid polymer (polylactic acid resin) is more preferable. Especially, since a lactic acid may be synthesized from non-petroleum materials such as sweet potato or corn, the polylactic acid resin may deal with a movement from a resin in which a petroleum material is used to a resin in which a petroleum material is not used. In this manner, the polylactic acid resin is derived from a plant, and has an effect of decreasing environmental burden, specifically, reducing $CO_2$ emission, reducing petroleum consumption amount, and the like.

The polylactic acid resin is not particularly limited, as long as it is condensate of lactic acid, and polylactic acid or a copolymer of lactic acid and other monomer is used. The polylactic acid resins may be used singly, or two or more types thereof may be used in combination. The content of the other monomers may be generally 1% mol to 50% mol of total monomer components. In addition, as the polylactic acid resin, a modified resin may be used. For example, maleic anhydride-modified polylactic acid, epoxy-modified polylactic acid, amine-modified polylactic acid, or the like may be used.

The other monomers may be a compound having two or more ester linkage forming functional groups, and for example, dicarboxylic acid, polyol, hydroxycarboxylic acid, lactone, or the like is used.

Examples of the dicarboxylic acid include succinic acid, azelaic acid, sebacic acid, terephthalic acid, and isophthalic acid.

Examples of polyol include aromatic polyol such as a compound obtained by adding and reacting ethylene oxide with bisphenol; aliphatic polyol such as ethylene glycol, propylene glycol, butanediol, hexanediol, octanediol, glycerin, sorbitan, trimethylol propane, and neopentyl glycol; and ether glycol such as diethylene glycol, triethylene glycol, polyethylene glycol, and polypropylene glycol.

Examples of hydroxycarboxylic acid include glycolic acid, hydroxybutyl carboxylic acid, and hydroxycarboxylic acid disclosed in JP-A-6-184417.

Examples of lactone include glycolide, $\epsilon$-caprolactoneglycolide, $\epsilon$-caprolactone, $\beta$-propiolactone, $\delta$-butyrolactone, $\beta$- or $\gamma$-butyrolactone, pivalolactone, and $\delta$-valerolactone.

As a method of synthesizing a polylactic acid resin, a well-known synthesis method may be used. Examples of the method of synthesizing a polylactic acid resin include a synthesis method disclosed in JP-A-7-33861; a synthesis method disclosed in JP-A-59-96123; and a synthesis method disclosed in "Polymer Preprints, Japan", vol. 44, pages 3198 and 3199. Specific examples include a synthesis method by direct dehydrative condensation of the lactic acid, and a synthesis method by ring-opening polymerization of lactide.

Examples of the lactide include L-lactide, D-lactide, DL-lactide, and meso-lactide. The lactides may be used singly, and two or more types thereof may be used in combination.

Examples of the lactic acid include L-lactic acid, D-lactic acid, DL-lactic acid. The lactic acids may be used singly, and two or more types thereof may be used in combination.

The polylactic acid resin may be poly-L-lactic acid (hereinafter, referred to as "PLLA"), and the poly-D-lactic acid (hereinafter, referred to as "PDLA"), may be a resin obtained by mixing these by copolymerization or blending, or may be a stereocomplex-type polylactic acid (hereinafter, referred to as "SC-PLA") in which poly-L-lactic acid and poly-D-lactic acid are mixed, helical structures thereof are engaged, and heat resistance is high.

A component ratio (molar ratio by percentage) of the poly-L-lactic acid and the poly-D-lactic acid in the copolymer or the mixture is not particularly limited, but in view of heat resistance, a range of L-lactic acid/D-lactic acid is preferably from 50/50 to 99.99/0.01. If the range of L-lactic acid/D-lactic acid is less than 50/50, the mechanical characteristics when molded into a molded article may decrease, and if the range exceeds 99.99/0.01, the cost may increase.

The polylactic acid resin may be a synthesized product, or may be a commercially available product. Examples of the commercially available product include "TERRAMAC TE4000", "TERRAMAC TE2000", and "TERRAMAC TE7000" manufactured by Unitika Ltd., "Ingeo3251D", "Ingeo3001D", and "Ingeo4032D" manufactured by NatureWorks LLC, and "REVODE110" and "REVODE190" manufactured by Zhejiang Hisun Biomaterials Co., Ltd.

A molecular weight of a polylactic acid resin is not particularly limited. However, according to the exemplary embodiment, a weight average molecular weight of the polylactic acid resin is in a range of 50,000 to 300,000, and more preferably in a range of 70,000 to 250,000. If the weight average molecular weight of the polylactic acid resin is less than 50,000, the mechanical characteristics when molded into a molded article may decrease, and if the weight average molecular weight of the polylactic acid resin exceeds 300,000, workability may be poor.

The glass transition temperature of the polylactic acid resin is not particularly limited, but is preferably in a range of 100° C. to 250° C., and more preferably in a range of 120° C. to 200° C. If the glass transition temperature of the polylactic acid resin is less than 100° C., the mechanical characteristics when molded into a molded article may decrease, and if the glass transition temperature of the polylactic acid resin exceeds 250° C., the workability may be poor.

The polylactic acid resin may include, as impurities caused on the production, a lactone compound such as cyclic lactone such as butyrolactone, and 1,6-dioxacyclodecane-2, 7-dione. It is preferable that the content of impurities such as the lactone compound is small. Specifically, the content is preferably less than 10% by weight, and more preferably less than 5% by weight of the amount of the polylactic acid. If the content of the impurities such as the lactone compound is 10% by weight or greater, the impurities react with polycarbonate and epoxy compounds, the reactivity with polyamide decreases. As a result, the mechanical characteristics when molded into a molded article may decrease.

Polycarbonate Resin

The resin composition according to the exemplary embodiment includes a polycarbonate resin. The inclusion of the polycarbonate resin enhances impact resistance or the like. The polycarbonate resin may be obtained by polycondensation of one or more kinds of monomers, and the polycarbonate resin is not particularly limited as long as it is a polymer having at least one carbonate group. For example, an aromatic polycarbonate resin such as bisphenol A-type polycarbonate, bisphenol S-type polycarbonate, biphenyl-type polycarbonate may be used.

The polycarbonate resin may be a synthesized product, or may be a commercially available product. Examples of the commercially available product include "L-1250Y" and "AD5503" manufactured by Tejin Limited, "A2200" manufactured by Idemitsu Kosan Co., Ltd., and "Iupilon S2000" (aromatic polycarbonate resin) manufactured by Mitsubishi Engineering-Plastics Corporation. In addition, the polycarbonate resin may be used singly, or two or more types thereof may be used in combination.

The molecular weight of the polycarbonate resin is not particularly limited, but according to the embodiment, the weight average molecular weight of the polycarbonate resin is preferably in a range of 5,000 to 30,000, and more preferably in a range of 10,000 to 25,000. If the weight average molecular weight of the polycarbonate resin is less than 5,000, the workability may decrease due to excessive fluidity, and if the weight average molecular weight of the polycarbonate resin exceeds 30,000, the workability may decrease due to lack of the fluidity.

The glass transition temperature of the polycarbonate resin is not particularly limited. However, the glass transition temperature is preferably in a range of 100° C. to 200° C., and more preferably in a range of 120° C. to 180° C. If the glass transition temperature of the polycarbonate resin is less than 100° C., the heat resistance may be deficient, and if the glass transition temperature of the polycarbonate resin exceeds 200° C., the workability may be deficient.

The polycarbonate resin may be an alloy resin obtained by combining at least one type of the polycarbonate resin and at least one type of the styrene resin.

Examples of the styrene resin include a general polystyrene resin (GPPS resin), a high impact polystyrene (HIPS) resin, a styrene butadiene rubber (SBR) resin, an acrylonitrile-butadiene rubber-styrene copolymer (ABS) resin, an acrylonitrile-ethylene propylene rubber-styrene copolymer (AES) resin, an acrylonitrile-acrylic rubber-styrene copolymer (AAS) resin, a methyl methacrylate-butadiene rubber-styrene copolymer (MBS) resin, an acrylonitrile-styrene copolymer (AS) resin, and a methyl methacrylate-styrene copolymer (MS) resin. Among these, the HIPS resin, the ABS resin, and the AS resin are preferable in view of the compatibility of the polycarbonate resin and the aliphatic polyester resin such as the polylactic acid resin.

The polycarbonate/styrene alloy resin may be a synthesized product, or may be a commercially available product. Examples of the commercially available product include "TN7300" (polycarbonate/ABS alloy resin) manufactured by Tejin Limited. In addition, the polycarbonate/styrene alloy resin may be used singly, or two or more types thereof may be used in combination.

The molecular weight of the polycarbonate/styrene alloy resin is not particularly limited. However, according to the exemplary embodiment, the weight average molecular weight of the polycarbonate/styrene alloy resin is preferably in a range of 5,000 to 300,000, and more preferably in a range of 10,000 to 150,000. If the weight average molecular weight of the polycarbonate/styrene alloy resin is less than 5,000, the workability may decrease due to the excessive fluidity, and if the weight average molecular weight of the polycarbonate/styrene alloy resin exceeds 300,000, the workability may decrease due to lack of the fluidity.

The glass transition temperature of the polycarbonate/styrene alloy resin is not particularly limited. However, the glass transition temperature is preferably in a range of 80° C. to 200° C., and more preferably in a range of 90° C. to 180° C. If the glass transition temperature of the polycarbonate/styrene alloy resin is less than 80° C., the heat resistance may be deficient, and if the glass transition temperature of the polycarbonate/styrene alloy resin exceeds 200° C., the workability may be deficient.

The weight ratio of the content of the polyester resin and the content of the polycarbonate resin is preferably in a range of 5:95 to 50:50, and more preferably in a range of 5:95 to 30:70. If the weight ratio of the content of the polyester resin and the content of the polycarbonate resin is less than 5:95, an effect of decreasing environmental burden may become small, and if the weight ratio exceeds 50:50, flame retardancy and anti-drip properties may not be sufficiently obtained.

Flame Retardant

The resin composition according to the exemplary embodiment includes a flame retardant. The inclusion of the flame retardant enhances flame retardancy when molded into a molded article. As the flame retardant, products which are generally used as flame retardant for a polymer may be used, and the flame retardant is not particularly limited. Examples of the flame retardant include an inorganic flame retardant and an organic flame retardant, and the flame retardant is not particularly limited. However, the flame retardant is preferably at least one selected from the group consisting of boric acid flame retardant, ammonia flame retardant, other inorganic flame retardant, nitrogen flame retardant, other organic flame retardant, and colloidal flame retardant. Examples of the boric acid flame retardant include compound containing boric acid, such as zinc borate hydrate, barium metaborate, and borax. Examples of the ammonia flame retardant include an ammonia compound such as ammonium sulfate. Examples of the other inorganic flame retardant include an iron oxide combustion catalyst such as ferrocene, a compound containing titanium such as titanium oxide, a guanidine compound such as guanidine sulfamate, a zirconium compound, a molybdenum compound, a tin compound, a carbonate compound such as potassium carbonate, and metal hydroxide such as aluminum hydroxide and magnesium hydroxide, and modified materials thereof. Examples of the nitrogen flame retardant include a cyanurate compound having a triazine ring. Examples of the other organic flame retardant include chlorendic anhydride, phthalic anhydride, compounds containing bisphenol A, a glycidyl compound such as glycidyl ether, polyol such as diethylene glycol and pentaerythritol, and silicone compounds such as modified carbamide, silicone oil, and organosiloxane. Examples of colloidal flame retardant include colloids of a flame retardant compound such as a metal hydroxide compound such as aluminum hydroxide, magnesium hydroxide, and calium hydroxide, a hydrate such as calcium aluminate, gypsum dihydrate, zinc borate, barium metaborate, borax, and kaolin clay, a nitrate compound such as sodium nitrate, a molybdenum compound, a zirconium compound, an antimony compound, dawsonite, and phlogopite, which have flame retardancy and have been used in the related art. The examples of the colloidal flame retardant may also include a phosphoric acid salt compound, and a phosphoric acid ester compound.

The flame retardant may be a synthesized product, or may be a commercially available product. The flame retardant may be used singly, or two or more types thereof may be used in combination.

The content of the flame retardant is not particularly limited, but the content of the flame retardant is preferably from 5% by weight to 100% by weight, and more preferably from 10% by weight to 50% by weight based on the total amount of the solid content of the resin composition. If the content of the other flame retardant is less than 5% by weight, flame retardancy may not be sufficiently obtained, and if the content exceeds 100% by weight, the mechanical characteristics when molded into a molded article may decrease.

Inorganic Fiber Coated with Fluorine Resin

The resin composition according to the exemplary embodiment includes an inorganic fiber coated with a fluorine resin. The inclusion of the inorganic fiber coated with a fluorine resin enhances flame retardancy and anti-drip properties when molded into a molded article. The inorganic fiber is a fiber including an inorganic compound as a main component. Examples of the inorganic fiber include a glass fiber, a carbon fiber, an alumina fiber, a zirconia fiber, a boron nitride fiber, and a silicon carbide fiber, and among these, a glass fiber is preferable.

An aspect ratio of the inorganic fiber (fiber length/fiber diameter) is 1.5 or greater, and is preferably 30 or greater.

The fluorine resin for coating the inorganic fiber is a polymer of monomers containing an unsaturated hydrocarbon monomer having a fluorine atom. Examples of the fluorine resin include polytetrafluoroethylene, tetrafluoroethylene-hexafluoropropylene copolymer, and tetrafluoroethylene-perfuloroalkylvinyl ether copolymer, and among these, polytetrafluoroethylene is preferable in view of chemical stability, heat resistance, and low friction characteristics.

For example, the weight average molecular weight of the fluorine resin is from 10,000 to 20,000,000.

The coating amount of the fluorine resin to the inorganic fiber is from 10 μm to 1 mm, as a thickness of the coating layer.

The content of the inorganic fiber coated with the fluorine resin is preferably in a range of 3% by weight to 20% by weight, and more preferably in a range of 5% by weight to 20% by weight, with respect to the total content of the polyester resin and the polycarbonate resin. If the content of the inorganic fiber coated with the fluorine resin is less than 3% by weight with respect to the total content of the polyester resin and the polycarbonate resin, flame retardancy and anti-drip properties may not be sufficiently obtained when molded into a molded article. If the content exceeds 20% by weight, appearance when molded into a molded article may be poor, and moldability may be poor.

Other Additives

As additives other than the flame retardant and the inorganic fiber coated with the fluorine resin, if necessary, an antioxidant, a filler, an anti-drip agent, and the like may be used. It is preferable that the contents of the other components are respectively 10% by weight or less based on the total amount of the solid content of the resin composition.

Examples of the antioxidant include phenol antioxidant, amine antioxidant, phosphorus antioxidant, sulfur antioxidant, hydroquinone antioxidant, and quinoline antioxidant. The antioxidant may be used singly, or two or more types thereof may be used in combination.

Examples of the filler include clay such as kaolin, bentonite, kibushi clay, and gairome clay, talc, mica, and montmorillonite. The filler may be used singly, or two or more types thereof may be used in combination.

The inclusion of the anti-drip agent enhances anti-drip properties (melt dripping preventing properties) when molded into a molded article. The anti-drip agent may be a synthesized product, or may be a commercially available product. Examples of the commercially available product include "PTFE CD145" manufactured by Asahi Glass Co., Ltd., and "FA500H" manufactured by Daikin Industries, Ltd., which are polytetrafluoroethylene. The anti-drip agents may be used singly, or two or more types thereof may be used in combination.

Various Measurement Methods

Contents of the polyester resin and the polycarbonate resin in the resin composition are measured by the $^1$H-NMR analysis. Contents of the impurities such as lactone compounds contained in the polylactic acid in the resin composition are measured in the same way. Contents of the polyester resin and the polycarbonate resin in the resin molded article obtainable by using the resin composition are measured by the $^1$H-NMR analysis. The contents of the polyester resin and the polycarbonate resin in the resin composition are measured from the contents of the polyester resin and the polycarbonate resin in the resin molded article measured in this manner.

The weight average molecular weights of the polyester resin and the polycarbonate resin in the resin composition are determined by dissolving polymers in a solvent and performing a size exclusion chromatography (GPC) with the solution. That is, the polymers are dissolved in tetrahydrofuran (THF) and analyzed with the molecular weight distribution measurement (GPC). The weight average molecular weights of the polyester resin and the polycarbonate resin in the resin molded article obtainable by using the resin composition are obtained by dissolving the polymers in the solvent, and performing the size exclusion chromatography (GPC) with the solution. That is, the polymers are dissolved in tetrahydrofuran (THF) and analyzed with the molecular weight distribution measurement (GPC).

The glass transition temperatures of the polyester resin and the polycarbonate resin in the resin composition are measured by using a thermal analyzer (DSC6000 manufactured by SII NanoTechnology Inc.) according to the method of JIS K 7121. The glass transition temperatures of the polyester resin and the polycarbonate resin in the resin molded article obtainable by using the resin composition are measured by using the thermal analyzer (DSC6000 manufactured by SII NanoTechnology Inc.) according to the method of JIS K 7121.

The fiber diameter and the fiber length of the inorganic fiber coated with the fluorine resin in the resin composition are obtained by dissolving a certain amount (for example, 10 g) of the resin composition in chloroform, and measuring remaining glass fibers with a scanning electron microscope. In addition, the number of measured glass fibers is 100.

With respect to the resin composition and the resin molded article obtainable by using the resin composition, contents of the flame retardant, the inorganic fibers coated with the fluorine resin, and the like in the resin composition and in the resin molded article are measured by measuring structures or composition ratios of respective materials by using an element analyzer, an NMR apparatus, an IR apparatus, and the like. In addition, the contents of the flame retardant, the inorganic fibers coated with fluorine resin, and the like in the resin composition are estimated from the contents of the flame retardant, the inorganic fibers coated with the fluorine resin, and the like in the resin molded article.

Method of Manufacturing Resin Composition

The resin composition according to the exemplary embodiment may be manufactured by kneading, for example, a polyester resin, a polycarbonate resin, a flame retardant, an inorganic fiber coated with a fluorine resin, and if necessary, other components.

The kneading is performed by using a well-known kneading apparatus such as a twin screw kneader (TEM58SS manufactured by Toshiba Machine Co., Ltd.) and a simple kneader (Labo plastomill manufactured by Toyo Seiki Seisaku-Sho, Ltd.). Here, the temperature condition (cylinder temperature condition) of the kneading is preferably in a range of 170° C. to 220° C., more preferably in a range of 180° C. to 220° C., and still more preferably in a range of 190° C. to 220° C. Accordingly, it is likely to obtain a molded article having excellent flame retardancy and excellent anti-drip properties.

Resin Molded Article

The resin molded article according to the exemplary embodiment may be obtained, for example, by molding a resin composition according to the exemplary embodiment described above.

The resin molded article according to the exemplary embodiment may be obtained according to a molding method such as injection molding, extrusion molding, blow molding, and hot press molding. Because of the productivity or the like, it is preferable that the resin molded article is obtained by performing injection molding with the resin composition according to the exemplary embodiment.

The injection molding may be performed by using a commercially available apparatus such as "NEX150" manufactured by Nissei Plastic Industrial Co., Ltd., "NEX70000" manufactured by Nissei Plastic Industrial Co., Ltd., and "SE50D" manufactured by Toshiba Machine Co., Ltd. At this point, in view of the decomposition inhibition of the resin, the cylinder temperature is preferable in a range of 170° C. to 250° C., and more preferably in a range of 180° C. to 240° C. In addition, in view of the productivity or the like, the mold temperature is preferably in a range of 30° C. to 100° C., and more preferably in a range of 30° C. to 60° C.

The resin molded article according to the exemplary embodiment has excellent flame retardancy and excellent anti-drip properties. In addition, the resin molded article according to the exemplary embodiment has excellent appearance, and the like.

Component of Electrical and Electronic Device

Since the resin molded article according to the exemplary embodiment may have excellent mechanical strength (impact resistance, tensile elastic modulus, and the like), the resin molded article may be preferably used for electrical and electronic devices, home appliances, containers, car interior materials, and the like. More specifically, the resin molded article may be used for housing, various kinds of components, and the like of home appliances, electrical and electronic devices or the like, wrapping films, storage cases for CD-ROM or DVD, tableware, food trays, drink bottles, medicine wrapping materials, and the like. Among these, the resin molded article is preferably used for components of electrical and electronic devices. Since many components of the electric and electronic apparatuses have complicated shapes and are heavy objects, the components require higher impact resistance than components which are not heavy objects. However, according to the resin molded article of the exemplary embodiment, such requirements are sufficiently satisfied. The resin molded article according to the exemplary embodiment is appropriately used, particularly, in housings of an image forming apparatus, a copying machine, or the like.

Example

The invention is described in detail with reference to examples and comparative examples. However, the invention is not limited to the examples described below.

Examples and Comparative Examples

Raw materials in compositions (parts by weight) presented in Tables 1 and 2 are mixed, put into the twin screw kneader (TEM58SS manufactured by Toshiba Machine Co., Ltd.), and kneaded at the cylinder temperature of 200° C., to obtain resin compositions (compounds). Subsequently, the obtained resin composition is molded at a cylinder temperature of 200° C., and a mold temperature of 50° C. in an injection molding apparatus (NEX 150E manufactured by Nissei Plastic Industrial Co., Ltd.) to obtain test samples. Product names and brand names of the respective components presented in Tables 1 and 2 are presented in Table 3.

In addition, a fluorine resin coated inorganic fiber D1 of Table 3 is manufactured in a method described below. Fluon AD936 manufactured by Asahi Glass Co., Ltd. is used as a polytetrafluoroethylene particle dispersion. The solid content concentration of AD936 is about 60% by weight, and 5% by weight of polyoxyethylene alkylphenyl ether is contained with respect to polytetrafluoroethylene. AD936 and distilled water are mixed and stirred to obtain a coating solution having a base concentration of 35% by weight. The coating solution is coated onto the glass fiber FT592 (manufactured by Owens Corning Corporation) by using a spray gun W-101-101G (manufactured by Anest Iwata Corporation). Thereafter, the resultant is dried at 120° C. for 5 minutes in an electric furnace F0310 (Yamato Scientific Co., Ltd.), and is fired at 380° C. for minutes. A fluorine resin inorganic fiber D2 is manufactured in the same manner as the fluorine resin coated inorganic fiber D1 except that a glass fiber FT592 (manufactured by Owens Corning Corporation) is changed to a glass fiber CSG3PA830 (manufactured by Nitto Boseki Co., Ltd.).

Evaluation Method

Flame Retardancy

The V test regulated in UL 94 is conducted with a test sample having thickness of 1.0 mm. In addition, results of combustion tests are high levels in a sequence of V-0, V-1, V-2, and not-V.

Anti-Drip Properties

Anti-drip properties are estimated by criteria described below according to the method of observing a sample at the time of the V test regulated in UL 94.

A: 5 items are evaluated, all the five items are V-1 or greater, and there is no deformation leading to drip B: 5 items are evaluated and all the five items are V-1 or greater, but deformation leading to drip is seen C: 5 items are evaluated and one item drips D: 5 items are evaluated and two or more items drip Estimation of Moldability Under the molding condition for molded articles of ISO multipurpose dumbbell samples (NEX150 manufactured by Nissei Plastic Industrial Co., Ltd., molding temperature of 200° C., retention time of 50 seconds), when the mold temperature is 80° C., 90° C., or 100° C., mold releasability of the resin molded article from the mold is evaluated. B or higher is considered to pass.

A: Separation is easy (Sample is not deformed and obtainment from mold is easy)

B: Separation is slightly difficult (Sample is slightly deformed and obtainment from mold is difficult)

C: Separation is difficult (Sample is greatly deformed)

Appearance of Molded Product

As a molded product, a product for injection estimation which has a flat plate shape of 80 mm×120 mm×2 mm (in thickness) and has 8 mmφ of a hole in a central portion thereof is molded, and appearance evaluation of weld lines formed from the hole in a resin flow direction, flow marks, and pearl luster are visually performed. As the visual evaluation, the following evaluations are performed by scores out of a maximum of 5 (maximum score: 5 points, minimum score: 1 point), and an average of the scores are evaluated.

Weld line: As the score is higher, weld lines are not easily recognized, and as the score is lower, weld lines are easily recognized Flow mark: As the score is higher, flow marks are not easily recognized, and as the score is lower, flow marks are easily recognized Pearl luster: As the score is higher, pearl luster is not easily recognized, and as the score is lower, pearl luster is easily recognized Average Score A: 4 points or greater B: 2 points or greater and less than 4 points C: less than 2 points

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Polyester resin | A1 | 10 | 30 | 30 | 5 | 50 | 30 | 30 | 30 | 30 |
| Polycarbonate resin | B1 | 90 | 70 | 70 | 95 | 50 | 70 | 70 | 70 | 70 |
| Flame retardant | C1 | 10 | 10 | 10 | 10 | 10 | 10 |  | 10 | 10 |

TABLE 1-continued

|  |  | Example 1 | Example 2 | Example 3 | Example 4 | Example 5 | Example 6 | Example 7 | Example 8 | Example 9 |
|---|---|---|---|---|---|---|---|---|---|---|
|  | C2 |  |  |  |  |  |  | 10 |  |  |
| Fluorine resin coated inorganic fiber | D1 | 5 | 3 | 5 | 5 | 5 | 20 | 5 |  | 5 |
|  | D2 |  |  |  |  |  |  |  | 5 |  |
| Glass fiber | E1 |  |  |  |  |  |  |  |  |  |
| PTFE | F1 |  |  |  |  |  |  |  |  | 0.5 |
| Flame retardancy |  | V0 | V1 | V0 | V0 | V1 | V0 | V1 | V0 | V0 |
| Anti-drip properties |  | A | B | A | A | B | A | B | B | A |
| Moldability |  | A | A | A | A | A | A | A | A | A |
| Appearance |  | A | A | A | A | A | A | A | A | A |

TABLE 2

|  |  | Comparative Example 1 | Comparative Example 2 | Comparative Example 3 | Comparative Example 4 | Comparative Example 5 |
|---|---|---|---|---|---|---|
| Polyester resin | A1 | 10 | 10 | 30 | 30 | 55 |
| Polycarbonate resin | B1 | 90 | 90 | 70 | 70 | 45 |
| Flame retardant | C1 | 10 | 10 | 10 | 0 | 10 |
| Fluorine resin coated inorganic fiber | D1 |  |  |  | 5 | 5 |
| Glass fiber | E1 | 1 | 5 | 5 |  |  |
| PTFE | F1 | 0.5 | 0.5 | 0.5 |  |  |
| Flame retardancy |  | not-V | not-V | not-V | not-V | not-V |
| Anti-drip properties |  | D | D | D | D | C |
| Moldability |  | B | B | B | B | B |
| Appearance |  | B | C | C | A | A |

TABLE 3

|  |  | Name | Vendor | Remark |
|---|---|---|---|---|
| Polyester resin | A1 | 3001D (polylactic acid) | NatureWorks LLC | Weight average molecular weight: 80,000 |
| Polycarbonate resin | B1 | TN7300 (PC/ABS alloy resin) | Tejin Limited | Weight average molecular weight: 45,000 |
| Flame retardant | C1 | PX200 | Daihachi Chemical Industry Co., Ltd. | Condensed phosphoric acid ester |
|  | C2 | AP422 | Clariant | Ammonium polyphosphate |
| Fluorine resin coated inorganic fiber | D1 | FT592 + AD936 | Owens Corning Corporation + Asahi Glass Co., Ltd. |  |
|  | D2 | CSG3PA830 + AD936 | Nitto Boseki Co., Ltd. + Asahi Glass Co., Ltd. |  |
| Glass fiber | E1 | FT592 | Owens Corning Corporation |  |
| PTFE | F1 | A3700 | Mitsubishi Rayon Co., Ltd. | Content of PTFE: 50% by weight |

In Examples 1, 2, and 3, flame retardancy, moldability, and appearance are satisfied. With respect to the anti-drip properties, Example 3 is better than Example 2. In Comparative Example 1, anti-drip properties are not sufficient, and combustion is continued. In Comparative Examples 2 and 3, the anti-drip properties are better than in Comparative Example 1, but combustion time becomes longer due to a candle effect and thus flame retardancy is deficient. Also, there are problems in moldability and appearance.

In this manner, the resin compositions in the examples have more excellent flame retardancy and anti-drip properties when molded into molded articles than the resin compositions of comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   a polyester resin;
   a polycarbonate resin;
   a flame retardant; and
   an inorganic fiber coated with a fluorine resin,
   wherein a weight ratio of a content of the polyester resin and a content of the polycarbonate resin is in a range of 5:95 to 50:50,
   wherein a content of the inorganic fiber coated with the fluorine resin is in a range of 3% by weight to 20% by weight with respect to a total content of the polyester resin and the polycarbonate resin,
   wherein the polyester resin is a polylactic acid resin, and
   wherein a content of the flame retardant is 10% by weight to 50% by weight based on the total amount of the solid content of the resin composition.

2. The resin composition according to claim 1, wherein the polylactic acid resin has a weight average molecular weight of 50,000 to 300,000.

3. The resin composition according to claim 1, wherein the polylactic acid resin has a weight average molecular weight of 70,000 to 250,000.

4. The resin composition according to claim 1, wherein the polylactic acid resin has a glass transition temperature of 100° C. to 250° C.

5. The resin composition according to claim 1, wherein the polycarbonate resin has a weight average molecular weight of 5,000 to 30,000.

6. The resin composition according to claim 1, wherein the polycarbonate resin has a weight average molecular weight of 10,000 to 25,000.

7. The resin composition according to claim 1, wherein the polycarbonate resin has a glass transition temperature of 100° C. to 200° C.

8. The resin composition according to claim 1, wherein the weight ratio of a content of the polyester resin and a content of the polycarbonate resin is in a range of 5:95 to 30:70.

9. The resin composition according to claim 1, wherein a content of the inorganic fiber coated with the fluorine resin is in a range of 5% by weight to 20% by weight with respect to a total content of the polyester resin and the polycarbonate resin.

10. A resin molded article obtainable by using the resin composition according to claim 1.

\* \* \* \* \*